United States Patent
Yamada

(10) Patent No.: US 8,285,476 B2
(45) Date of Patent: Oct. 9, 2012

(54) VEHICLE POSITION CALCULATING DEVICE AND VEHICLE POSITION CALCULATING METHOD

(75) Inventor: Yuki Yamada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 256 days.

(21) Appl. No.: 12/515,457

(22) PCT Filed: Sep. 3, 2008

(86) PCT No.: PCT/JP2008/065868
§ 371 (c)(1),
(2), (4) Date: May 19, 2009

(87) PCT Pub. No.: WO2009/031580
PCT Pub. Date: Mar. 12, 2009

(65) Prior Publication Data
US 2010/0076682 A1    Mar. 25, 2010

(30) Foreign Application Priority Data
Sep. 6, 2007 (JP) ................................ 2007-231985

(51) Int. Cl.
*G05D 1/02* (2006.01)
*G06F 17/10* (2006.01)
*G06G 7/78* (2006.01)
(52) U.S. Cl. ........................................ 701/300
(58) Field of Classification Search .................... 701/300
See application file for complete search history.

(56) References Cited

U.S. PATENT DOCUMENTS 5,911,773 A * 6/1999 Mutsuga et al. ............ 701/414
6,169,940 B1 * 1/2001 Jitsukata et al. ............ 701/23
6,169,956 B1 * 1/2001 Morimoto et al. ........... 701/428
7,463,974 B2 * 12/2008 Morita et al. ............... 701/442
7,869,947 B2 * 1/2011 Schirmer et al. ............ 701/411

(Continued)

FOREIGN PATENT DOCUMENTS

JP    A-2-110317    4/1990

(Continued)

OTHER PUBLICATIONS

English language version of Mar. 30, 2010 International Preliminary Report on Patentability issued in PCT/JP2008/065868.

*Primary Examiner* — Gerald J. O'Connor
*Assistant Examiner* — Neha Patel
(74) *Attorney, Agent, or Firm* — Oliff & Berridge, PLC

(57) ABSTRACT

A vehicle position calculating apparatus and vehicle position calculating method which can accurately calculate a current position of a vehicle regardless of the orientation of the vehicle at the time when acquiring positional information.

An advancing direction detecting section in a vehicle position calculating ECU detects an advancing direction of a vehicle in a receiving area according to receiving area form information issued from a receiving area form acquiring section, moving distance information issued from a moving distance calculating section, and course change information issued from a course changing action detecting section. A vehicle position calculating section sets a reference position according to reference positional information issued from a reference position acquiring section, and calculates the current vehicle position by taking account of the advancing direction in addition to a relative change based on relative change information issued from the relative position change detecting section.

8 Claims, 11 Drawing Sheets

U.S. PATENT DOCUMENTS

2001/0020201 A1* 9/2001 Shirai et al. .................... 701/1
2010/0019937 A1* 1/2010 Mori et al. .................... 340/936

FOREIGN PATENT DOCUMENTS

| JP | A-2-268528 | 11/1990 |
| JP | A-6-300579 | 10/1994 |
| JP | A-11-160085 | 6/1999 |
| JP | A-2003-30781 | 1/2003 |
| JP | A-2003-42798 | 2/2003 |

* cited by examiner (a)

(b)

(c)

(a)

(b)

VEHICLE POSITION CALCULATING DEVICE AND VEHICLE POSITION CALCULATING METHOD

TECHNICAL FIELD

The present invention relates to a vehicle position calculating apparatus and vehicle position calculating method which calculate a current position of a running vehicle.

BACKGROUND ART

As demanded by car navigation systems, logistics, and the like, it has recently been desired to calculate running positions of vehicles. Known as a technique for calculating a running position of such a vehicle is one using a road-side device such as an optical beacon (e.g., Patent Literature 1). This technique takes out positional information (x, y) included in a beacon signal transmitted from an optical beacon and detects a moving direction and distance (Δx, Δy) by which a vehicle autonomously travels from a position where this positional information (x, y) is taken out. The autonomously traveled moving direction and distance (Δx, Δy) is added to the positional information (x, y), so as to calculate the current position (x+Δx, y+Δy) of the vehicle at that point of time.

Patent Literature 1: Japanese Patent Application Laid-Open No. 11-160085

DISCLOSURE OF INVENTION

Technical Problem

However, the technique disclosed in the above-mentioned Patent Literature simply adds the autonomously traveled moving direction and distance (Δx, Δy) to the positional information (x, y), so as to calculate the current position (x+Δx, y+Δy) of the vehicle. Hence, no consideration is given to the orientation of the vehicle at the position where the positional information is acquired. As a consequence, it has been problematic in that the calculated vehicle position may incur a greater error depending on the orientation of the vehicle at the time when the positional information is acquired.

It is therefore an object of the present invention to provide a vehicle position calculating apparatus and vehicle position calculating method which can accurately calculate a current position of a vehicle regardless of the orientation of the vehicle at the time when the positional information is acquired.

Solution to Problem

The vehicle position calculating apparatus in accordance with the present invention having achieved the above-mentioned object comprises reference positional info nation acquiring means for acquiring reference positional information to become a reference position for detecting a position of a vehicle from a road-side device, advancing direction detecting means for detecting an advancing direction of the vehicle at a point of time when the reference position is acquired, running state relative change detecting means for detecting a relative change in a running state of the vehicle with respect to the running state of the vehicle at the point of time when the reference position is acquired, and position calculating means for calculating the position of the vehicle according to the advancing direction of the vehicle detected by the advancing direction detecting means and the change in the running state of the vehicle detected by the running state change detecting means.

The vehicle position calculating apparatus in accordance with the present invention detects the advancing direction of the vehicle at the point of time when the reference position is acquired from the road-side device, and calculates the position of the vehicle according to the detected advancing direction and change in the running state of the vehicle. As a consequence, the position of the vehicle can be determined while additionally taking account of the orientation of the vehicle at the reference position. Therefore, the current position of the vehicle can accurately be calculated regardless of the orientation of the vehicle at the point of time when the positional information to become the reference position is acquired.

The "point of time when the reference position is acquired" herein refers to the advancing direction at the time when starting calculating the relative change in the vehicle position and includes a point of time "when the vehicle passes and exits a receiving area" in an embodiment which will be explained later, for example.

Here, the position calculating means may determine a relative change in the position of the vehicle with respect to the reference position according to the advancing direction of the vehicle detected by the advancing direction detecting means and the change in the running state of the vehicle detected by the running state change detecting means, and calculate the position of the vehicle according to the reference position and the relative change in the position of the vehicle with respect to the reference position.

Thus calculating the position of the vehicle after determining the relative change in the position of the vehicle allows the position of the vehicle to be calculated by a simple arithmetic operation. The position of the vehicle may also be calculated directly from the reference position and the change in the running state of the vehicle, for example, without determining the relative change in the vehicle position.

The advancing direction detecting means may detect the advancing direction at the point of time when the vehicle acquires the reference position, while discriminating a direction along a lane provided with the road-side device and a direction traversing the lane from each other.

Thus detecting the advancing direction while discriminating a direction along the lane provided with the road-side device and a direction traversing the lane from each other allows the vehicle position to be calculated accurately by a simple calculation according to their difference.

The road-side device may be a beacon for feeding wireless data to a receiving area having a predetermined form on a road where the vehicle runs, the beacon supplying receiving area information concerning the receiving area by the wireless data, the apparatus may further comprise receiving area information acquiring means for acquiring the receiving area information supplied from the beacon and moving distance calculating means for calculating a distance traveled by the vehicle during communication with the beacon, and the advancing direction detecting means may detect the advancing direction of the vehicle according to the form of the receiving area fed with the wireless data and the moving distance calculated by the moving distance calculating means.

When thus detected by using the receiving area to which the wireless data is fed by the beacon, the advancing direction of the vehicle can be detected accurately without being bound by environmental factors and personal characteristics.

The apparatus may further comprise course changing action detecting means for detecting a course changing action of the vehicle and, when the course changing action is detected during communication with the road-side device, the advancing direction detecting means may detect the advancing direction of the vehicle according to a distance traveled from when starting the communication until the course changing action is detected and a distance traveled from when the course changing action is detected until the communication ends.

Thus using the course changing action can detect the advancing direction of the vehicle further accurately. Examples of the changing action of the vehicle in the present invention include steering angle operation histories, whether or not winkers are operated, and crossing of white lines.

The vehicle position calculating method in accordance with the present invention having achieved the above-mentioned object comprises a reference positional information acquiring step of acquiring reference positional information to become a reference position for detecting a position of a vehicle from a road-side device, an advancing direction detecting step of detecting an advancing direction of the vehicle at a point of time when the reference position is acquired, a running state relative change detecting step of detecting a relative change in a running state of the vehicle with respect to the running state of the vehicle at the point of time when the reference position is acquired, and a position calculating step of calculating the position of the vehicle according to the advancing direction of the vehicle detected by the advancing direction detecting step and the change in the running state of the vehicle detected by the running state change detecting step.

The position calculating step may be a step of determining a relative change in the position of the vehicle with respect to the reference position according to the advancing direction of the vehicle detected by the advancing direction detecting step and the change in the running state of the vehicle detected by the running state change detecting step, and calculate the position of the vehicle according to the reference position and the relative change in the position of the vehicle with respect to the reference position.

The advancing direction detecting step may detect the advancing direction at the point of time when the vehicle acquires the reference position, while discriminating a direction along a lane provided with the road-side device and a direction traversing the lane from each other.

The road-side device may be a beacon for feeding wireless data to a receiving area having a predetermined form on a road where the vehicle runs, the beacon supplying receiving area information concerning the receiving area by the wireless data, the method may further comprise a receiving area information acquiring step of acquiring the receiving area information supplied from the beacon and a moving distance calculating step of calculating a distance traveled by the vehicle during communication with the beacon, and the advancing direction detecting step may detect the advancing direction of the vehicle according to the form of the receiving area fed with the wireless data and the moving distance calculated by the moving distance calculating step.

The method may further comprise a course changing action detecting step of detecting a course changing action of the vehicle and, when the course changing action is detected during communication with the road-side device, the advancing direction detecting step may detect the advancing direction of the vehicle according to a distance traveled from when starting the communication until the course changing action is detected and a distance traveled from when the course changing action is detected until the communication ends.

Further scope of applicability of the present invention will become apparent from the detailed description given hereinafter. However, it should be understood that the detailed description and specific examples, while indicating preferred embodiments of the present invention, are given by illustration only, since various changes and modifications within the spirit and scope of the invention will become apparent to those skilled in the art from this detailed description.

Advantageous Effects of Invention

The vehicle position calculating apparatus and vehicle position calculating method in accordance with the present invention can accurately calculate a current position of a vehicle regardless of the orientation of the vehicle at the time when the positional information is acquired.

Reference Signs List

Figure 1:
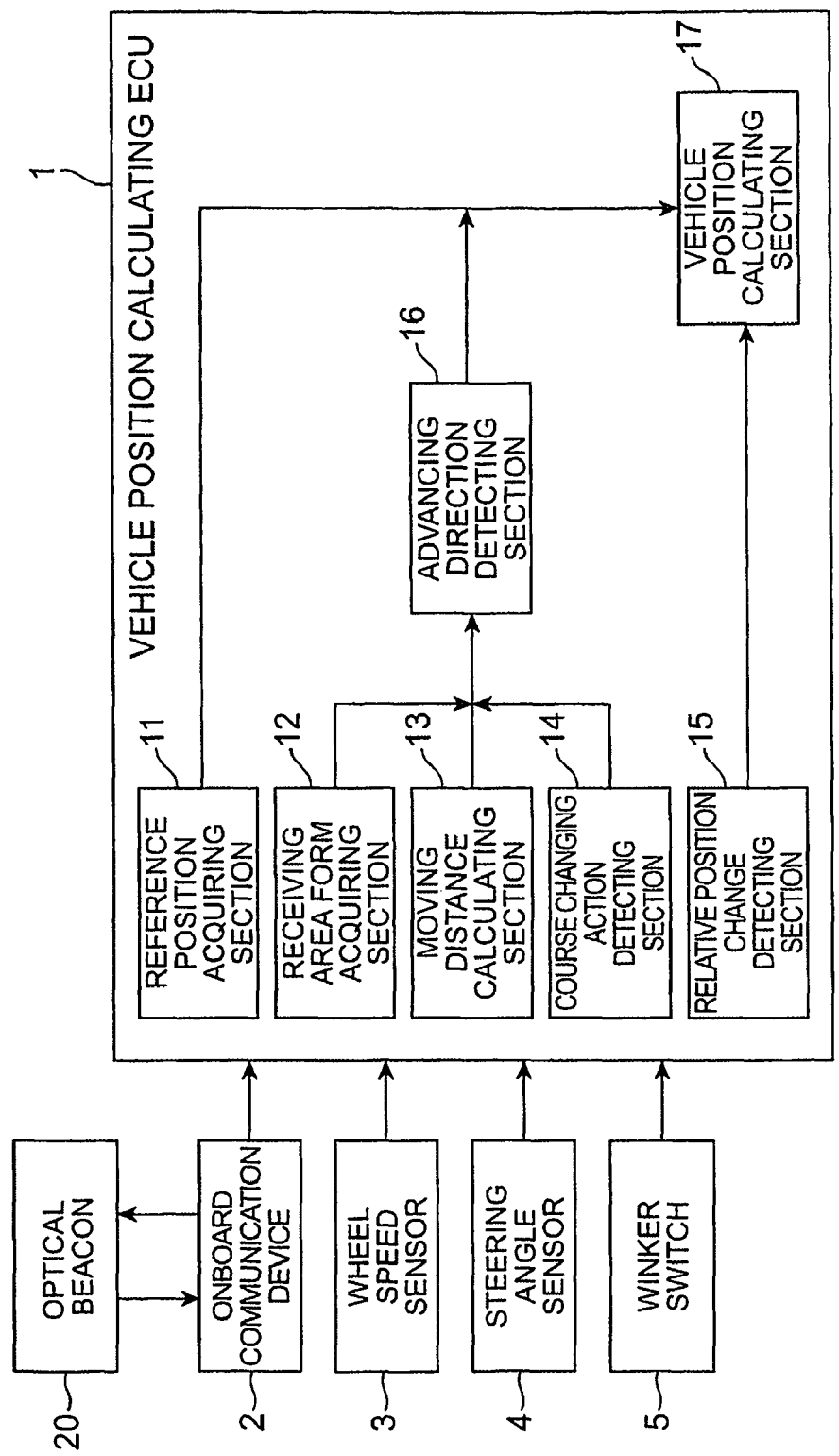
FIG. 1 is a block diagram of the vehicle position calculating apparatus in accordance with the present invention.

1 . . . vehicle position electronic control unit ECU; 2 . . . onboard communication device; 3 . . . wheel speed sensor; 4 . . . steering angle sensor; 5 . . . winker switch; 11 . . . reference position acquiring section; 12 . . . receiving area form acquiring section; 13 . . . moving distance calculating section; 14 . . . course changing action detecting section; 15 . . . relative position change detecting section; 16 . . . advancing direction detecting section; 17 . . . vehicle position calculating section; 20 . . . optical beacon; 30 . . . traffic light; 34 . . . right-turn arrow light; d . . . moving distance; d1 . . . first moving distance; d2 . . . second moving distance; LA . . . main line; LB . . . branch line; ra . . . longer radius; rb . . . deviation-considering radius; rc . . . shorter radius; X . . . course changing action position

DESCRIPTION OF EMBODIMENTS

In the following, embodiments of the present invention will be explained with reference to the accompanying drawings. In the explanation of the drawings, the same constituents will be referred to with the same signs while omitting their overlapping descriptions. For convenience of illustration, ratios of dimensions in the drawings do not always coincide with those explained.

FIG. 1 is a block diagram of the vehicle position calculating apparatus in accordance with the present invention. As illustrated in FIG. 1, a vehicle position calculating ECU 1 which is the vehicle position calculating apparatus in accordance with this embodiment is provided in an undepicted vehicle and comprises a reference position acquiring section 11, a receiving area form acquiring section 12, and a moving distance calculating section 13. The vehicle position calculating ECU 1 also comprises a course changing action detecting section 14, a relative position change detecting section 15, an advancing direction detecting section 16, and a vehicle position calculating section 17. Connected to the vehicle position calculating ECU 1 are an onboard communication device 2, a wheel speed sensor 3, a steering angle sensor 4, and a winker switch 5.

Figure 5:
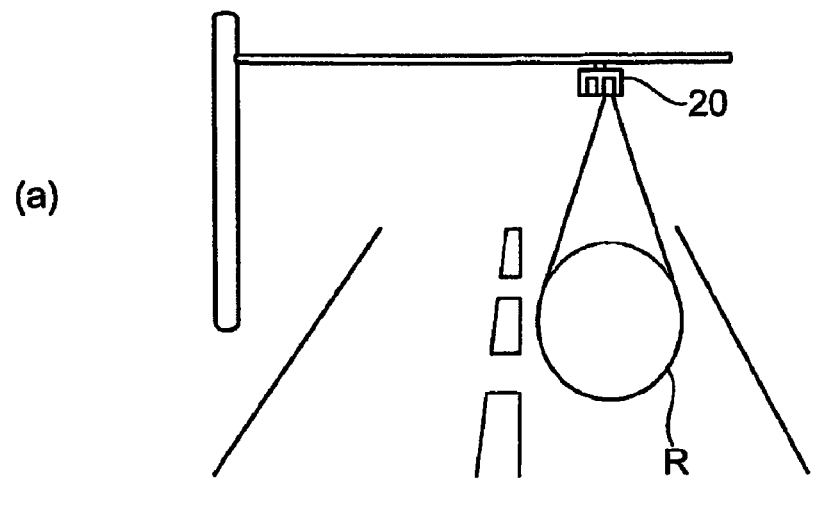
In FIG. 5, (a) is a schematic perspective view for explaining a state where an optical beacon is placed, (b) is a plan view of an irradiation area, and (c) is a road diagram in the vicinity of a road where the optical beacon is provided.
Figure 5:
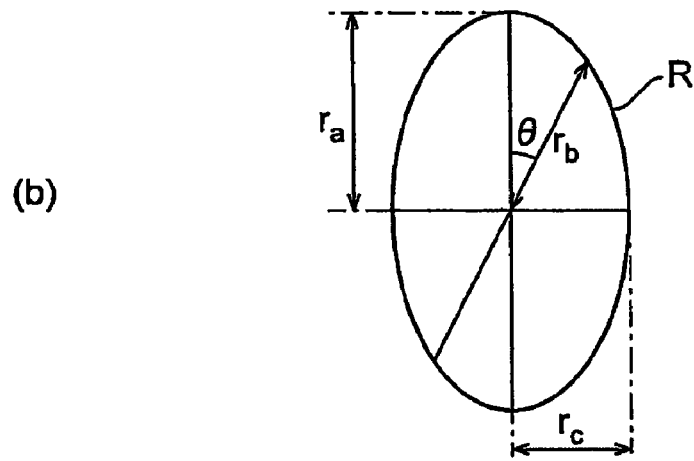
Figure 5:
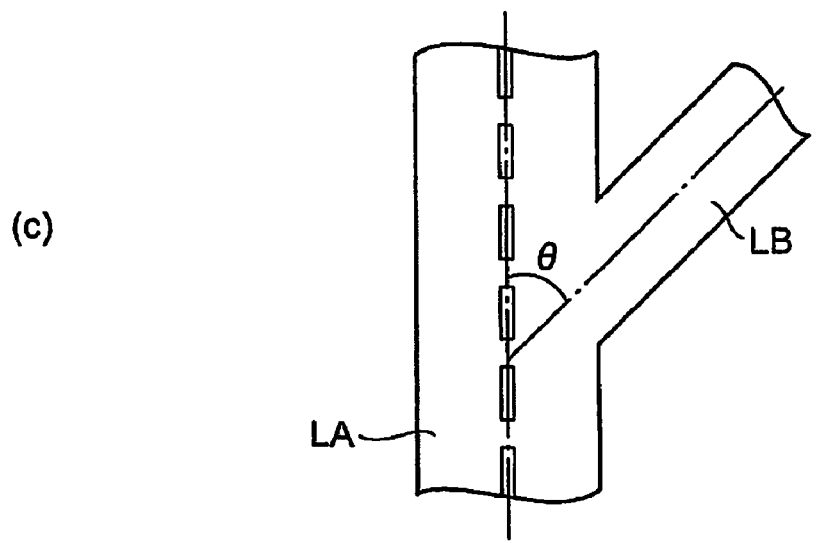

As illustrated in FIG. 5(a), the onboard communication device 2 carries out bidirectional communications with an optical beacon 20 which is a road-side device placed on the road side. Data can be transmitted and received through infrared rays between the optical beacon 20 and the onboard communication device 2. The optical beacon 20 transmits infrastructure coordination information, which includes positional information of a position where the optical beacon 20 is placed, and Vehicle Information and Communication System (VICS) information. The onboard communication device 2 receives the infrastructure coordination information and VICS information transmitted from the optical beacon 20. On the other hand, the onboard communication device 2 transmits Vehicle ID information. The optical beacon 20 receives the vehicle ID information transmitted from the onboard communication device 2. Thus, the bidirectional communications are carried out between the optical beacon 20 and onboard communication device 2.

A receiving area, which is a transmission area where the optical beacon 20 transmits signals and in which the onboard communication device 2 can receive the signals transmitted by the optical beacon 20, has an elliptical form when reaching a road. The elliptical receiving area has a longer radius of 6.3 m and a shorter radius of 4 m, for example. Upon receiving the data transmitted from the optical beacon 20, the onboard communication device 2 outputs the optical beacon positional information indicating the position of the optical beacon 20 and the optical beacon information including the receiving area information to the reference position acquiring section 11, receiving area form acquiring section 12, and relative position change detecting section 15 in the vehicle position calculating ECU 1.

The wheel speed sensor 3 is a sensor which is provided with each wheel and detects a wheel speed pulse thereof. The wheel speed sensor 3 detects the wheel speed pulse of each wheel and outputs the detected wheel speed pulse to the moving distance calculating section 13 and relative position change detecting section 15 in the vehicle position calculating ECU 1.

The steering angle sensor 4 is constituted by a rotary encoder or the like provided with a steering wheel which is not depicted. The steering angle sensor 4 detects the direction and magnitude of the steering angle fed by a driver and transmits a steering angle signal corresponding to the detected direction and magnitude of the steering angle to the vehicle position calculating ECU 1.

The winker switch 5 is provided with an undepicted winker and detects the operating state of the winker. When an operation for turning left or right is carried out with respect to the winker, the winker switch 5 outputs its corresponding winker operation information to the course changing action detecting section 14 and relative position change detecting section 15 in the vehicle position calculating ECU 1.

When obtaining the optical beacon positional information included in the optical beacon information issued from the onboard communication device 2, the reference position acquiring section 11 in the vehicle position calculating ECU 1 acquires the optical beacon position as a reference position. To the vehicle position calculating section 17, the reference position acquiring section 11 outputs reference positional information concerning the acquired reference position.

According to the receiving area information included in the optical beacon information issued from the onboard communication device 2, the receiving area form acquiring section 12 acquires a receiving area form which is the form of the receiving area where signals from the optical beacon 20 are receivable. Upon receiving the receiving area form, the receiving area form acquiring section 12 outputs receiving area information concerning the acquired receiving area form to the advancing direction detecting section 16. As illustrated in FIG. 5(b), a receiving area R where signals from the optical beacon 20 are receivable has an elliptical Run.

The receiving area information includes the form of the receiving area, which is elliptical in this embodiment, and its longer radius ra, shorter radius rc, and radius taking account of a deviation angle (hereinafter referred to as "deviation-considering radius") rb. The deviation-considering radius rb is determined according to the angle θ between a main line LA and a branch line LB deviating from the main line LA on the road illustrated in FIG. 5(c). Here, the angle θ may be set individually or uniformly for the respective positions where the optical beacons 20 are provided.

According to the wheel speed pulse issued from the wheel speed sensor 3, the moving speed calculating section 13 calculates the vehicle speed. Also, during when the onboard communication device 2 outputs the optical beacon information, the moving distance calculating section 13 calculates, from the calculated vehicle speed and the time when the optical beacon information is issued, the moving distance of the vehicle after the optical beacon information is issued. The moving distance calculating section 13 outputs moving distance information concerning the calculated moving distance to the relative position change detecting section 15 and advancing direction detecting section 16.

According to the steering angle signal transmitted from the steering angle sensor 4, the course changing action detecting section 14 detects whether or not a course changing action occurs in the vehicle. Upon detecting the course changing action, the course changing action detecting section 14 outputs course change information to the advancing direction detecting section 16. When the winker operation information is issued from the winker switch 5, the course changing action detecting section 14 outputs the winker operation information to the advancing direction detecting section 16. The course change information includes information about not only whether the course is changed or not but also a direction into which the course changes. Similarly, the winker operation information includes information about not only whether the winker is operated or not but also the direction indicated by the winker.

According to the wheel speed pulse issued from the wheel speed sensor 3, the relative position change detecting section 15 calculates the vehicle speed. Also, after the onboard communication device 2 finishes outputting the optical beacon information, the relative position change detecting section 15 calculates, from the calculated vehicle speed and the time elapsed after finishing the output of the optical beacon information, the moving distance of the vehicle after exiting the receiving area. Further, according to the steering angle signal transmitted from the steering angle sensor 4, the relative position change detecting section 15 acquires a history of steering angles of the vehicle after the optical beacon information signal is issued from the onboard communication device 2. According to the moving speed of the vehicle after exiting the receiving area and the history of steering angles, the relative position change detecting section 15 detects the relative change in the vehicle position moved from the reference position. To the vehicle position calculating section 17, the relative position change detecting section 15 outputs relative position change information based on the detected relative change in the vehicle position.

According to the receiving area form information issued from the receiving area form acquiring section 12, the moving distance information issued from the moving distance calculating section 13, and the course change information issued from the course changing action detecting section 14, the advancing direction detecting section 16 detects the advancing direction of the vehicle in the receiving area. A specific procedure for detecting the advancing direction will be explained later. To the vehicle position calculating section 17, the advancing direction detecting section 16 outputs advancing direction information concerning the detected advancing direction.

According to the reference positional information issued from the reference position acquiring section 11, the relative change information issued from the relative position change detecting section 15, and the advancing direction information issued from the advancing direction detecting section 16, the vehicle position calculating section 17 calculates the current vehicle position. A procedure for calculating the current vehicle position will also be explained later.

The procedure for calculating the vehicle position in the vehicle position calculating apparatus in accordance with this embodiment will now be explained. The vehicle position calculating apparatus in accordance with this embodiment communicates with the optical beacon 20 and then calculates a position at which the vehicle currently runs after exiting the receiving area of the optical beacon 20.

Figure 2:
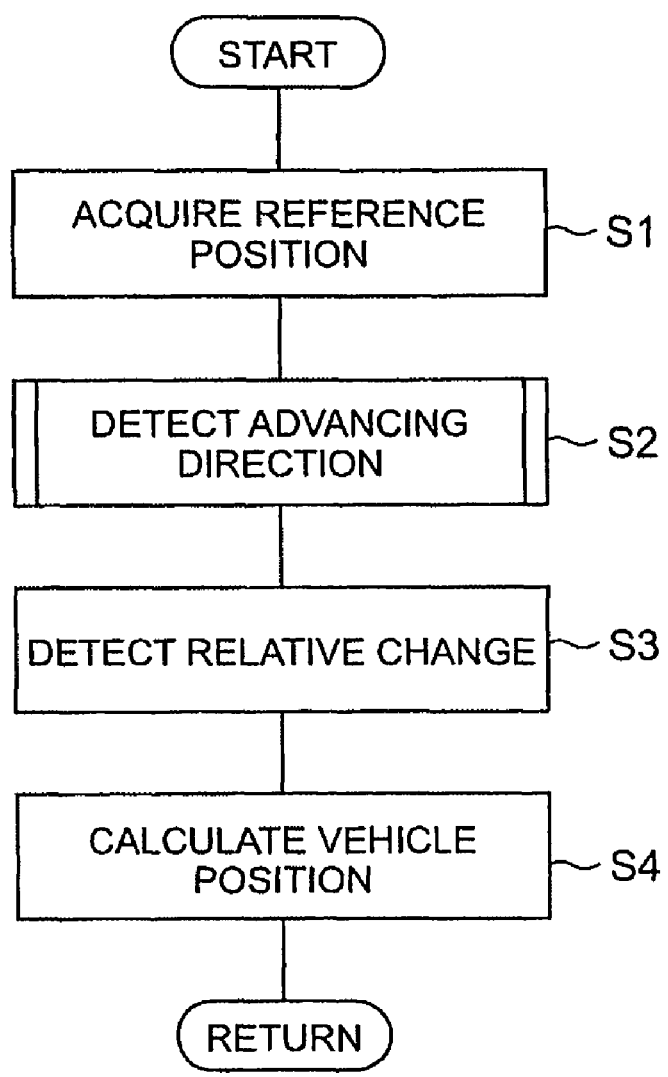
FIG. 2 is a flowchart illustrating a procedure of processing in the vehicle position calculating apparatus.

FIG. 2 is a flowchart illustrating a procedure of processing in the vehicle position calculating apparatus in accordance with this embodiment.

In the vehicle position calculating apparatus in accordance with this embodiment, as illustrated in FIG. 2, the reference position acquiring section 11 initially acquires a reference position (S1). Employed as the reference position acquired here is the position of the optical beacon 20 based on the optical beacon positional information included in the optical-beacon-related information transmitted from the optical beacon 20. The reference position acquired here is defined as reference position (x, y).

After acquiring the reference position, the advancing direction detecting section 16 detects the advancing direction of a vehicle when it passes and exits the receiving area, i.e., at the point of time acquiring the reference position (S2). To the vehicle position calculating section 17, the advancing direction detecting section 16 outputs the advancing direction information concerning the detected advancing direction.

Figure 3:
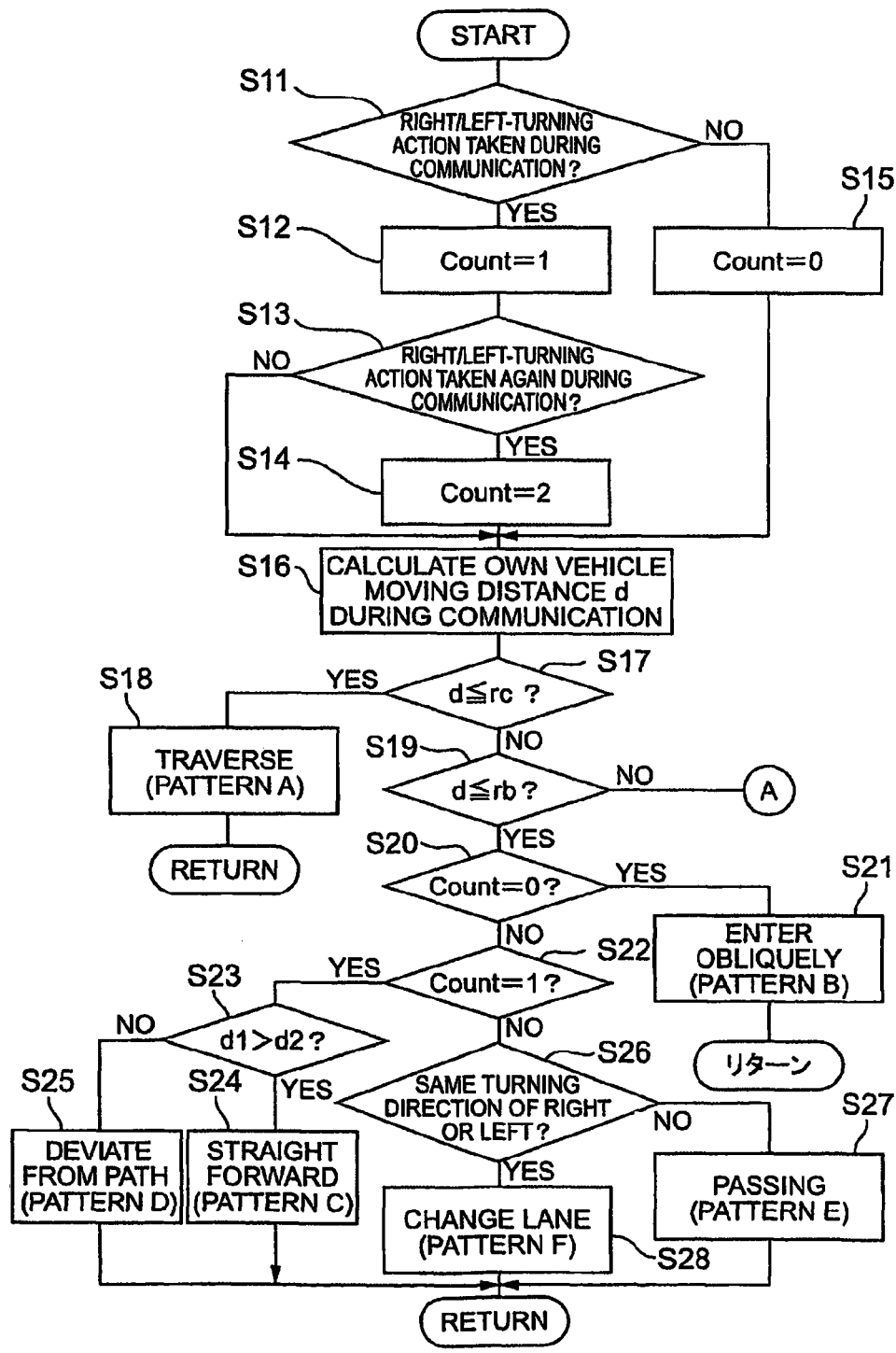
FIG. 3 is a flowchart illustrating a procedure of processing for detecting an advancing direction of a vehicle.

The advancing direction of the vehicle is detected along the flow illustrated in FIG. 3. The advancing direction of the vehicle is detected basically according to the relationship between the moving distance (hereinafter referred to as "moving distance during communication") d of the vehicle during when the optical beacon 20 communicates with the onboard communication device 2 and each radius of the receiving area. Roughly speaking, it is determined that the vehicle travels straightforward through the receiving area when the moving distance during communication d does not exceed the longer radius ra but is greater than the deviation-considering radius rb. When the moving distance during communication d does not exceed the deviation-considering radius rb but is greater than the shorter radius rc, it is determined that the vehicle runs obliquely through the receiving area. When the moving distance during communication d does not exceed the shorter radius rc, it is determined that the vehicle changes the lane by traversing the receiving area or the vehicle is one running the next lane. When the moving distance during communication d is greater than the longer radius ra, it is determined that the system is malfunctioning or the vehicle is meandering. Specifically, the advancing direction is detected along the flowchart illustrated in FIG. 3.

FIG. 3 is a flowchart illustrating a procedure of processing for detecting the advancing direction of the vehicle. For detecting the advancing direction, as illustrated in FIG. 3, it is determined whether or not the vehicle takes a right/left-turning action during when the optical beacon 20 and the onboard communication device 2 communicate with each other (S11). Whether or not the optical beacon 20 and the onboard communication device 2 are communicating with each other is determined according to the optical beacon information issued from the onboard communication device 2. Whether or not the vehicle takes a right/left-turning action is determined according to the course change information issued from the course changing action detecting section 14. Though it is determined that the right/left-turning action is taken when the course change information is issued from the course changing action detecting section 14 here, it may be determined so when the course change information and the winker operation information indicating that the winker is operated are issued.

In the case where it is determined that the vehicle takes no right/left-turning action during when the optical beacon 20 and the onboard communication device 2 communicate with each other as a result, the flow proceeds to step S16 while keeping a counter at 0 (S12). In the case where it is determined that the vehicle takes a right/left-turning action during when the optical beacon 20 and the onboard communication device 2 communicate with each other, on the other hand, the counter is set to 1 (S12). Subsequently, it is determined whether or not the vehicle further takes a right/left-turning action during when the optical beacon 20 and the onboard communication device 2 communicate with each other (S13).

In the case where it is determined that the vehicle takes no right/left-turning action during when the optical beacon 20 and the onboard communication device 2 communicate with each other as a result, the flow proceeds to step S16 while keeping the counter at 1. In the case where it is determined that the vehicle takes a right/left-turning action during when the optical beacon 20 and the onboard communication device 2 communicate with each other, the flow proceeds to step S16 while setting the counter to 2 (S14).

After setting the counter at steps S12, S14, and S15, the moving distance during communication d is calculated in the moving distance calculating section 13 (S16). The moving distance during communication d is calculated according to the vehicle speed calculated during when the optical beacon information is issued from the onboard communication device 2 and the time during which the optical beacon information is issued (the time during which the optical beacon 20 and the onboard communication device 2 communicate with each other).

The time during which the optical beacon information is issued may be calculated by storing respective times when receiving the initial and last data of the optical beacon and determining the difference therebetween or by the number of frames of data received from the optical beacon, for example. However, these methods demand the maximum capacity of data to be downlinked even when less amount of data is needed, while errors may be caused by dropping data when using the number of frames of data. For evading these inconveniences, the time during which the infrared rays from the optical beacon are sensed may be measured. The moving distance during communication d becomes shorter as the vehicle speed is higher, and thus may also be calculated by multiplying the vehicle speed by a coefficient inversely proportional thereto.

After calculating the moving distance during communication d, the moving distance calculating section 13 outputs moving distance information concerning the moving distance during communication d to the advancing direction detecting section 16. On the other hand, the receiving area form acquiring section 12 outputs to the advancing direction detecting section 16 the receiving area information issued from the onboard communication device 2.

The advancing direction detecting section 16 compares the moving distance during communication d acquired from the moving distance information issued from the moving distance calculating section 13 and the shorter radius rc of the receiving area acquired from the receiving area information issued from the receiving area form acquiring section 12 with each other, thereby determining whether or not the moving distance during communication d fails to exceed the shorter radius rc of the receiving area (S17).

Figure 6:
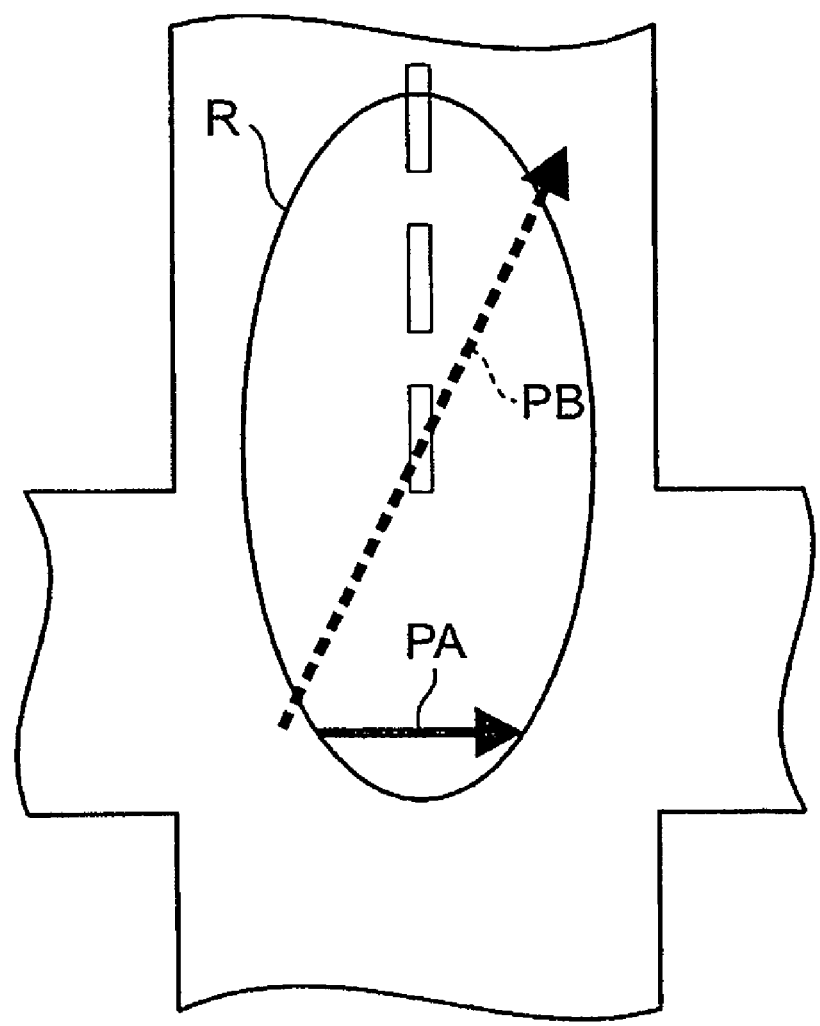
FIG. 6 is an explanatory view for explaining an example of traffic patterns of a vehicle in a receiving area.

In the case where it is determined that the moving distance during communication d fails to exceed the shorter radius rc of the receiving area as a result, the vehicle seems to traverse the receiving area. It is therefore determined to be a pattern A (PA) in which the vehicle runs such as to traverse the receiving area R as illustrated in FIG. 6 (S18). In this case, the vehicle advances sideways on the road provided with the beacon 20. The advancing direction detecting process is thus terminated.

In the case where it is determined that the moving distance during communication d exceeds the shorter radius rc of the receiving area (the moving distance during communication d is greater than the shorter radius rc of the receiving area), it is determined whether or not the moving distance during communication d fails to exceed the deviation-considering radius rb of the receiving area (S19). In the case where it is determined that the moving distance during communication d fails to exceed the deviation-considering radius rb of the receiving area as a result, it is determined whether or not the counter is at 0 (S20).

In the case where it is determined that the counter is at 0 here, the vehicle does not change the advancing direction in the receiving area. In this case, the vehicle seems to run obliquely through the receiving area. It is therefore determined to be a pattern B (PB) in which the vehicle runs obliquely through the receiving area R as illustrated in FIG. 6 (S21). In this case, the vehicle advances obliquely through the road provided with the beacon 20. The advancing direction detecting process is thus terminated.

In the case where it is determined that the counter is not at 0 here, it is determined whether or not the counter is 1 (S22). In the case where it is determined that the counter is at 1 as a result, it seems to be either a pattern C (PC) in which the vehicle advances straightforward after obliquely entering the receiving area R or a pattern D (PD) in which the vehicle advances straightforward into the receiving area and then deviates from its path by moving obliquely as illustrated in FIG. 7.

Figure 8:
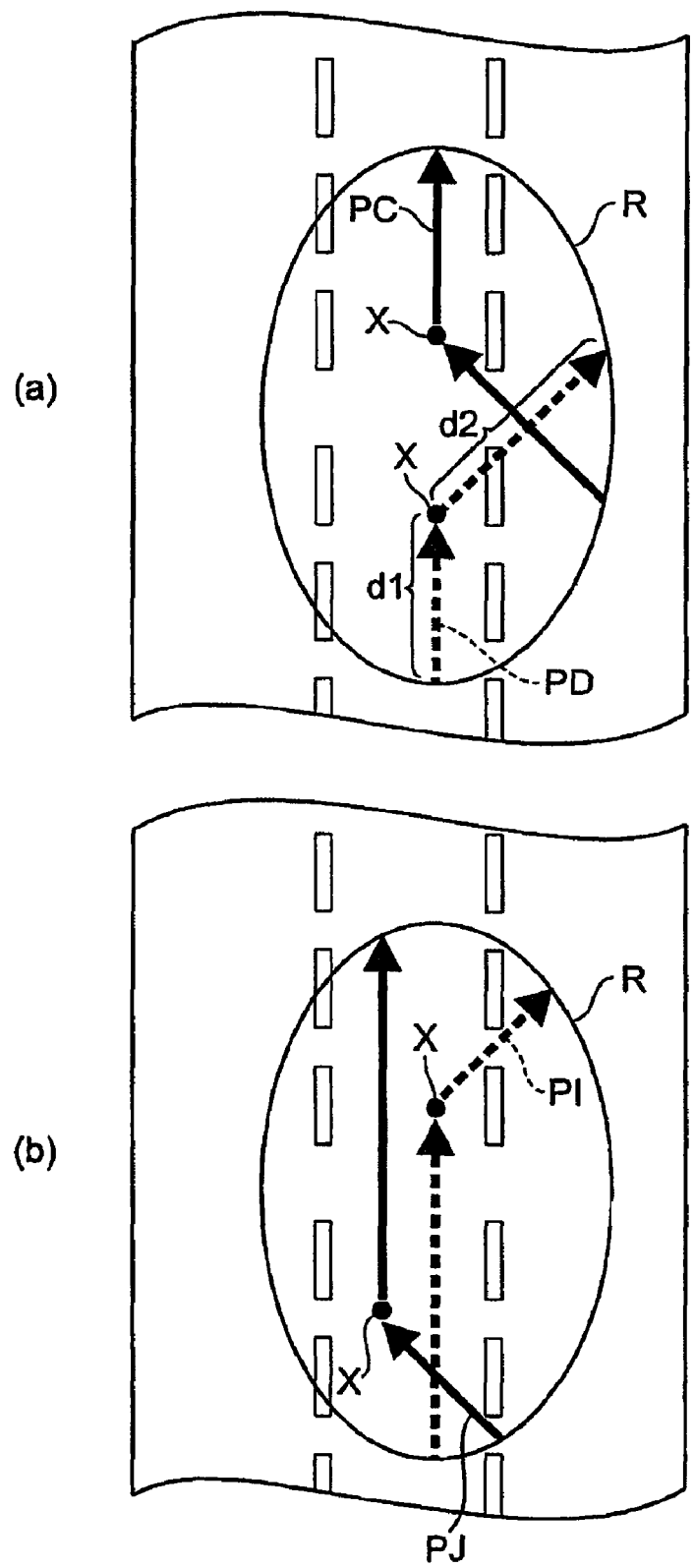
In FIG. 8, both (a) and (b) are explanatory views for explaining relationships between a first moving distance d1 and a second moving distance when a course changing action is carried out once within the receiving area.

Here, since the receiving area R has an elliptical form, which one of the above two is correct can be determined in view of properties of the elliptical form according to whether the distance (hereinafter referred to as "first moving distance during communication") d1 by which the vehicle moves from when the optical beacon 20 and the onboard communication device 2 start communicating with each other to a position X (hereinafter referred to as "course changing action position") where the vehicle takes a course changing action is longer or shorter than the distance (hereinafter referred to as "second moving distance during communication") d2 by which the vehicle moves from the course changing action position X until the optical beacon 20 and onboard communication device 2 finish communicating with each other as illustrated in FIG. 8(a).

Specifically, when the first moving distance during communication d1 is longer than the second moving distance during communication d2, it is the pattern C (PC) in which the vehicle advances straightforward after obliquely entering the receiving area R. Conversely, when the second moving distance during communication d2 is longer than the first moving distance during communication d1, it is the pattern D (PD) in which the vehicle advances straightforward into the receiving area R and then deviates from its path by moving obliquely. Therefore, in the case where it is determined that the counter is at 1, it is determined whether or not the first moving distance during communication d1 is longer than the second moving distance during communication d2 (S23).

Figure 7:
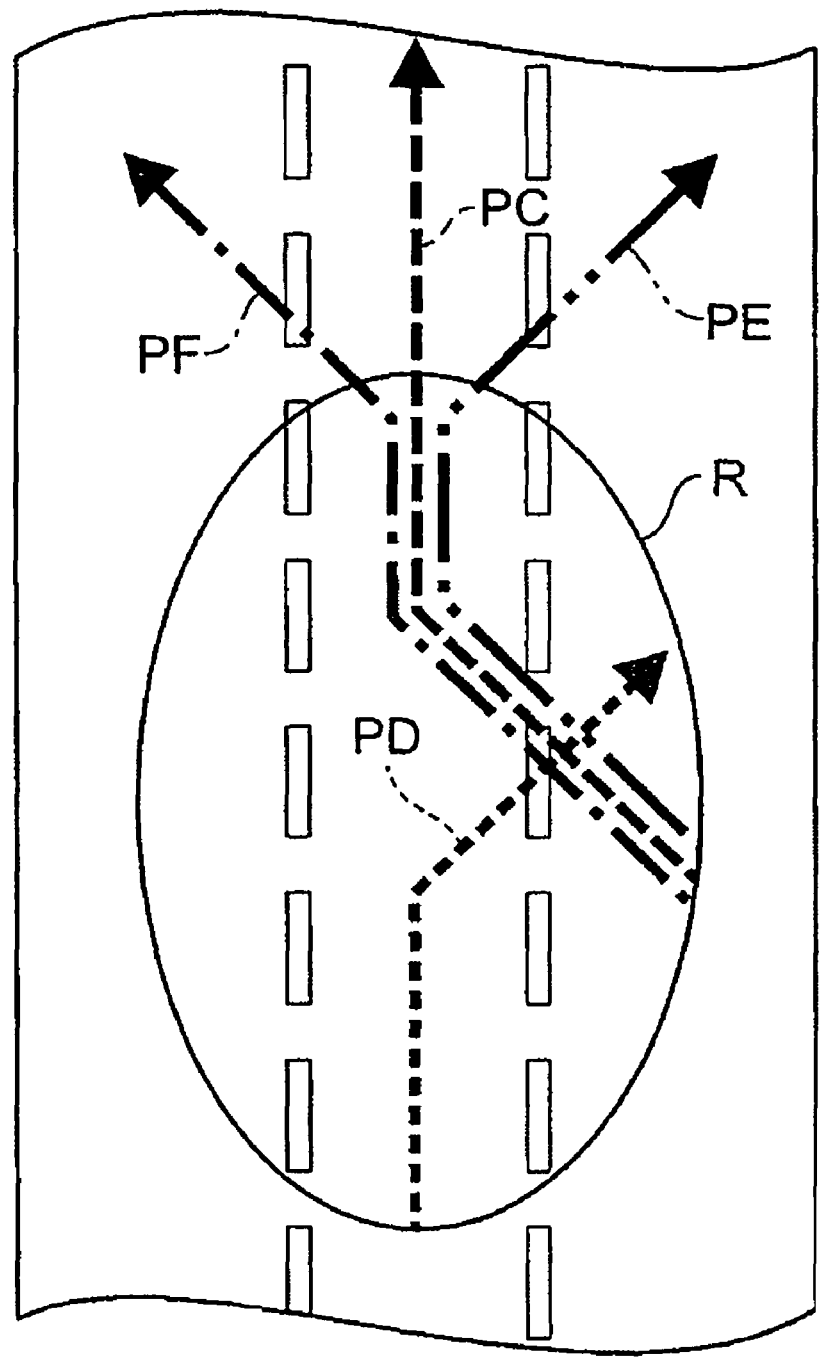
FIG. 7 is an explanatory view for explaining other examples of traffic patterns of the vehicle.

In the case where it is determined that the first moving distance during communication d1 is longer than the second moving distance during communication d2 as a result, it is determined to be the pattern C (PC) in which the vehicle advances straightforward after obliquely entering the receiving area R as illustrated in FIG. 7 (S24). In this case, the vehicle advances straightforward on the road provided with the beacon 20. The advancing direction detecting process is thus terminated. In the case where it is determined that the first moving distance during communication d1 is not longer than the second moving distance during communication d2, on the other hand, it is determined to be the pattern D (PD) in which the vehicle advances straightforward into the receiving area R and then deviates from its path by moving obliquely (S25). In this case, the vehicle advances obliquely on the road provided with the beacon 20. The advancing direction detecting process is thus terminated.

In the case where it is determined at step S22 that the counter is not at 1, the counter is at 2. In this case, there are two course changing actions, whereby it is determined whether or not the two course changing actions have the same turning direction of right or left (S26). In the case where it is determined that the two course changing actions do not have the same turning direction of right or left as a result, it is determined to be a pattern E (PE) in which the vehicle carries out a passing action in the receiving area R as illustrated in FIG. 7 (S27). In this case, the vehicle advances straightforward on the road provided with the beacon 20 without changing the lane. The advancing direction detecting process is thus terminated.

In the case where it is determined that the two course changing actions have the same turning direction of right or left, on the other hand, it is determined to be a pattern F (PF) in which the vehicle changes the lane in the receiving area R as illustrated in FIG. 7 (S28). In this case, the vehicle advances straightforward on the road provided with the beacon 20 by changing the lane. The advancing direction detecting process is thus terminated.

Figure 4:
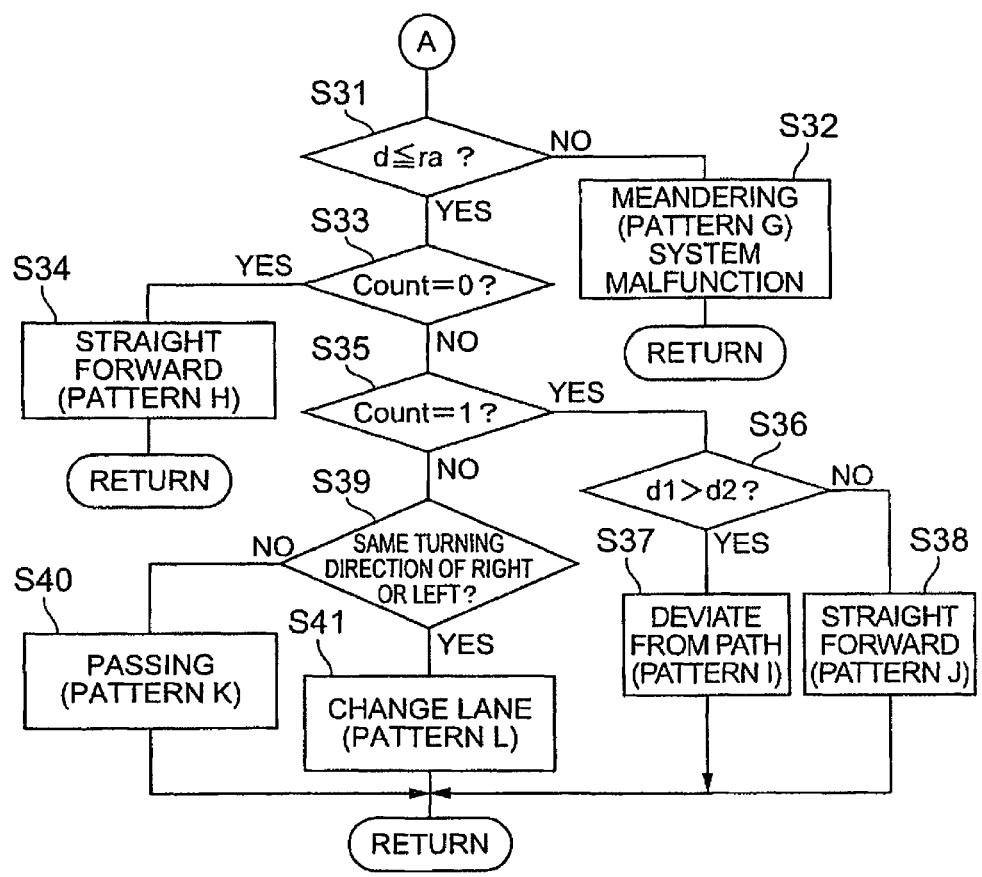
FIG. 4 is a flowchart illustrating a procedure of processing subsequent to FIG. 3.
Figure 9:
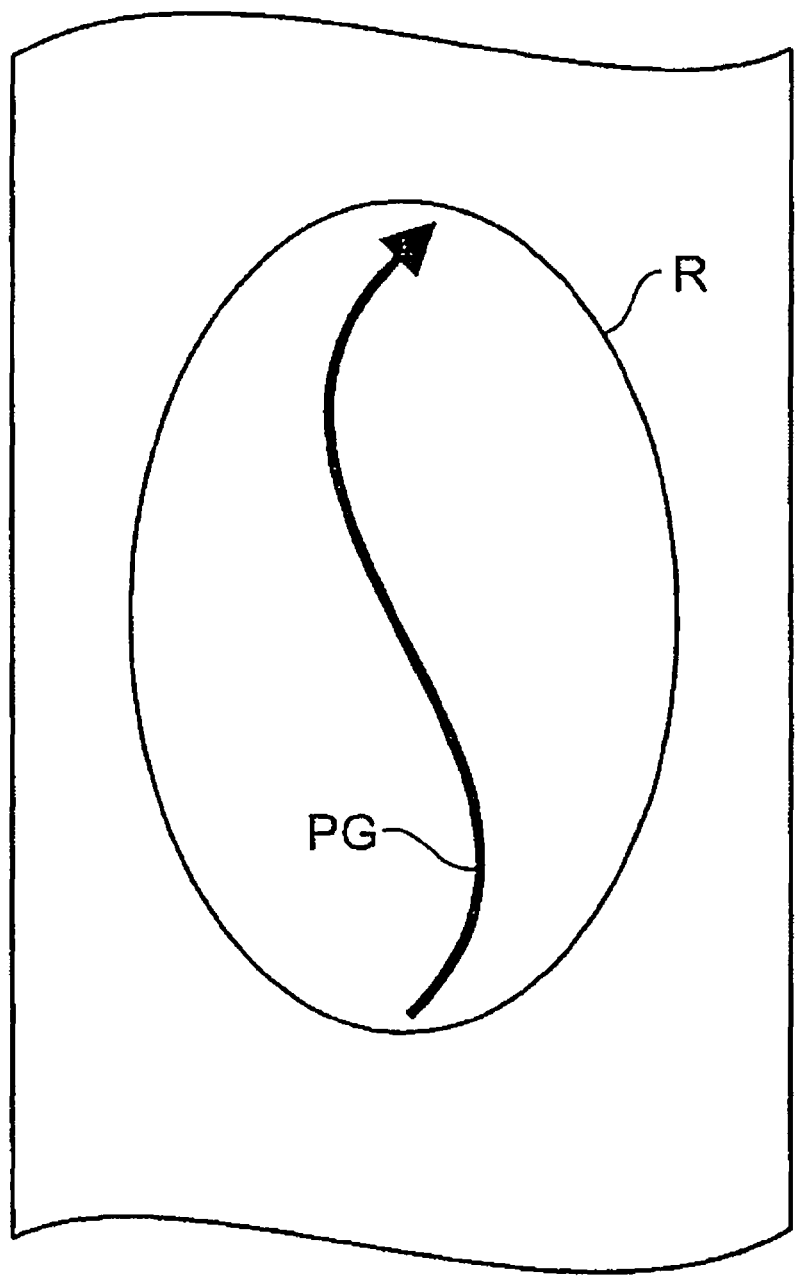
FIG. 9 is an explanatory view for explaining still another example of traffic patterns of the vehicle.

In the case where it is determined that the moving distance during communication d exceeds the deviation-considering radius rb of the receiving area R (the moving distance during communication d is greater than the deviation-considering radius rb of the receiving area R), the procedure proceeds to the flow illustrated in FIG. 4. Subsequently, it is determined whether or not the moving distance during communication d fails to exceed the longer radius ra of the receiving area R (S31). In the case where it is determined that the moving distance during communication d exceeds the longer radius ra of the receiving area R as a result, it is determined to be a pattern G (PG) in which the vehicle is meandering as illustrated in FIG. 9 or a system malfunction (S32). In this case, the advancing direction detecting process is terminated as it is while assuming that the vehicle advances straightforward without detecting its advancing direction.

Figure 10:
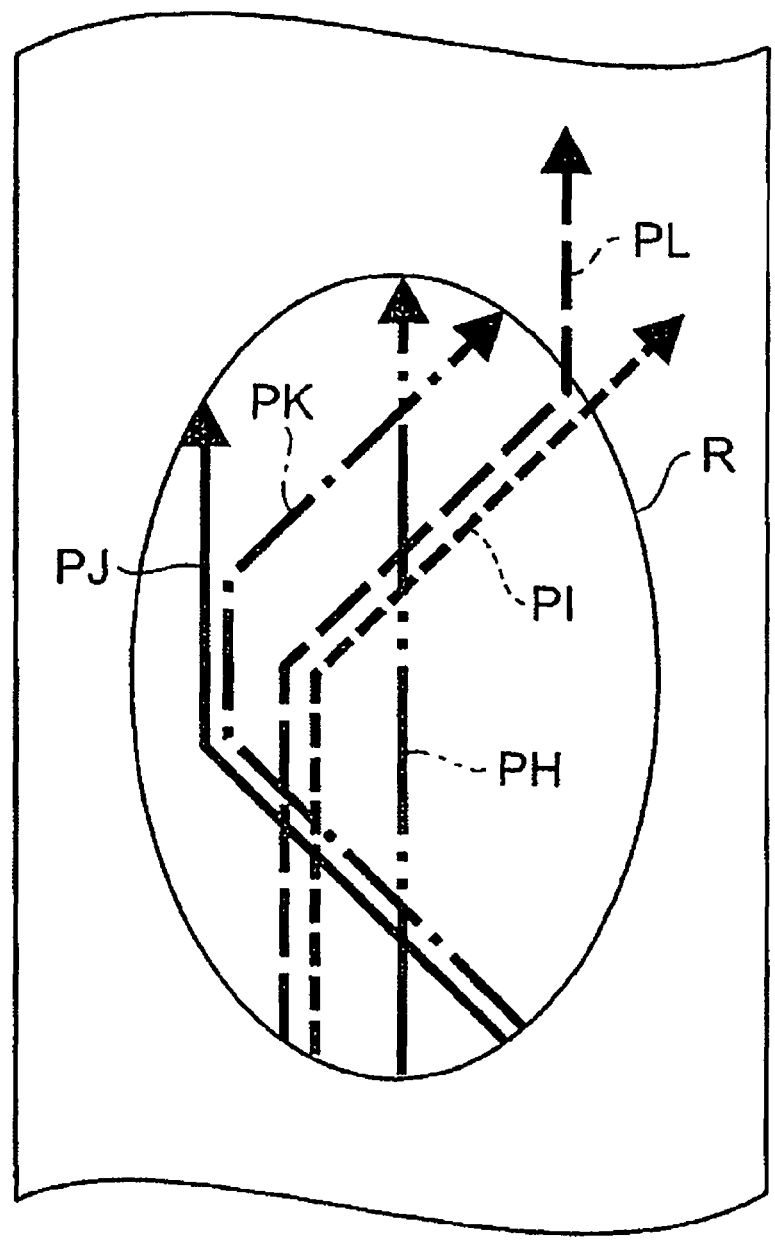
FIG. 10 is an explanatory view for explaining still other examples of traffic patterns of the vehicle; and In FIG. 11, (a) is a front view of a traffic light with an arrow light, while (b) is a plan view illustrating a receiving area of an optical beacon provided in front of a position where the traffic light is placed.

In the case where it is determined that the moving distance during communication d fails to exceed the longer radius ra of the receiving area R, on the other hand, it is determined whether or not the counter is at 0 (S33). In the case where it is determined that the counter is at 0 as a result, the vehicle does not change its advancing direction in the receiving area R. In this case, it is determined to be a pattern H (PH) in which the vehicle advances straightforward at a position near the center of the receiving area R as illustrated in FIG. 10 (S34). In this case, the vehicle advances straightforward on the road provided with the beacon 20. The advancing direction detecting process is thus terminated.

In the case where it is determined at step S33 that the counter is not at 0, it is determined whether or not the counter is at 1 (S35). In the case where it is determined that the counter is at 1 as a result, it is determined to be either a pattern I (PI) in which the vehicle advances straightforward after obliquely entering the receiving area R or a pattern J (PJ) in which the vehicle advances straightforward into the receiving area R, then deviates from the path by moving obliquely, and changes the course such as to advance forward after leaving the receiving area R.

Since the receiving area R has an elliptical form, which one of the above two is correct can be determined in view of properties of the elliptical form according to whether or not the first moving distance during communication d1 is longer or shorter than the second moving distance during communication d2 as illustrated in FIG. 8(b) in this case as well. Specifically, in the case where the first moving distance during communication d1 is longer than the second moving distance during communication d2, it is the pattern I (PI) in which the vehicle advances straightforward into the receiving area R and then deviates from the path by moving obliquely. Conversely, in the case where the second moving distance during communication d2 is greater than the first moving distance during communication d1, it is the pattern J (PJ) in which the vehicle advances straightforward after obliquely entering the receiving area R. Therefore, in the case where it is determined that the counter is at 1, it is determined whether or not the first moving distance during communication d1 is longer than the second moving distance during communication d2 (S36).

In the case where it is determined that the first moving distance during communication d1 is longer than the second moving distance during communication d2 as a result, it is determined to be the pattern I (PI) in which the vehicle advances straightforward into the receiving area R and then deviates from its path by moving obliquely as illustrated in FIG. 10 (S37). In this case, the vehicle advances obliquely on the road provided with the beacon 20. The advancing direction detecting process is thus terminated. In the case where it is determined that the first moving distance during communication d1 is not longer than the second moving distance during communication d2, it is determined to be the pattern C (PC) in which the vehicle advances straightforward after obliquely entering the receiving area R (S38). In this case, the vehicle advances straightforward on the road provided with the beacon 20. The advancing direction detecting process is thus terminated.

In the case where it is determined at step S35 that the counter is not at 1, the counter is at 2. In this case, there are two course changing actions, whereby it is determined whether or not the two course changing actions have the same turning direction of right or left (S39). In the case where it is determined that the two course changing actions do not have the same turning direction of right or left as a result, it is determined to be a pattern K (PK) in which the vehicle carries out a passing action in the receiving area R as illustrated in FIG. 10 (S40). In this case, the vehicle advances straightforward on the road provided with the beacon 20 without changing the lane. The advancing direction detecting process is thus terminated.

In the case where it is determined that the two course changing actions have the same turning direction of right or left, on the other hand, it is determined to be a pattern L (PL) in which the vehicle changes the lane in the receiving area R as illustrated in FIG. 10 (S41). In this case, the vehicle advances straightforward on the road provided with the beacon 20 by changing the lane. The advancing direction detecting process is thus terminated.

Returning to the flow illustrated in FIG. 2, upon detecting the advancing direction of the vehicle, the relative position change detecting section 15 detects the relative change in the vehicle position (S3). According to the moving distance of the vehicle after leaving the receiving area R and the history of steering angles, the relative position change detecting section 15 detects the relative position change ($\Delta x$, $\Delta y$) of the vehicle from the reference position. To the vehicle position calculating section 17, the relative position change detecting section 15 outputs relative change information based on the detected relative change in the vehicle position.

Subsequently, the vehicle position calculating section 17 calculates the vehicle position (S4). When calculating the vehicle position, the reference position (x, y) acquired by the reference position acquiring section 11 at step S1, the advancing direction detected by the advancing direction detecting section 16 at step S2, and the relative change in the vehicle position detected by the relative position change detecting section 15 at step S3 are used. In the case where it is determined that the advancing direction at the reference position detected by the advancing direction detecting section 16 is straightforward on the road, a position (x+$\Delta x$, y+$\Delta y$) obtained by adding the vehicle position relative change ($\Delta x$, $\Delta y$) to the reference position (x, y) is calculated as the current vehicle position.

In the case where a change in the advancing direction of the vehicle with respect to the extending direction of the road is detected by the advancing direction detecting section 16, the current position of the vehicle is calculated while additionally taking account of the change in the advancing direction of the vehicle. In the case where it is determined that the vehicle traverses the road as in step S18, for example, the vehicle position relative change ($\Delta x$, $\Delta y$) is transformed into a 90°-rotated position ($\Delta y$, $\Delta x$), whereby the current position is calculated as (x+$\Delta y$, y+$\Delta x$).

In the case where the advancing direction detecting section 16 detects that the vehicle changes the lane, the current position of the vehicle is calculated while additionally taking account of the lane change. In the case where it is determined that the vehicle changes the lane as in step S28, for example, a position (x+Δx+α, y+Δy) obtained by adding the vehicle position relative change (Δx, Δy) to a position (x+α, y) adding a lane width α to the reference position may be calculated as the current position.

In the case where a branch road is located beyond a position where the optical beacon 20 is placed on the main road as road information included in the infrastructure coordination information transmitted from the optical beacon 20, it can be determined that the vehicle enters the branch road when a deviation from the path is detected at step S25. In the subsequent position calculation, a position having corrected the position (x+Δy, y+Δx) by additionally taking account of the fact that the vehicle runs a side road may be calculated as the current position.

Thus, the vehicle position calculating apparatus in accordance with this embodiment calculates the current position of the vehicle by taking account of the advancing direction of the vehicle at the reference position in addition to the reference position and the relative change in the vehicle position. Therefore, the position of the vehicle can be determined while additionally taking account of the orientation of the vehicle at the reference position. Hence, the current vehicle position can accurately be calculated regardless of the orientation of the vehicle at the time when the positional information to become the reference position is acquired.

The position of the vehicle is calculated after determining the relative change in the vehicle position, and thus can be calculated by a simple arithmetic operation. Since the advancing direction is detected while discriminating a direction along a lane provided with the optical beacon 20 and a direction traversing the lane from each other, the vehicle position can accurately be calculated regardless of the running state of the vehicle at the reference position. The advancing direction of the vehicle is detected by using the receiving area to which the wireless data is fed by the optical beacon 20, and thus can be detected accurately without being bound by environmental factors and personal characteristics. Also, the advancing direction is calculated by using the course changing action of the vehicle caused by the steering operation, and thus can be detected further accurately.

On the other hand, the course changing action at the reference position is detected according to the steering angle and winker operation in the above-mentioned embodiment, but may also be detected by the fact that the vehicle crosses a white line. In this case, a stereo camera is connected to the vehicle position calculating ECU 1. The stereo camera is placed at a position where a white line painted on the road about the vehicle can be captured. The course changing action detecting section 14 in the vehicle position calculating ECU 1 is equipped with a white line detecting function for processing an image captured by the stereo camera, so as to detect the white line in the image.

In this case, at steps S11 and S13, whether or not the vehicle takes a right/left-turning action during when the optical beacon 20 and the onboard communication device 2 communicate with each other can be determined according to whether or not the vehicle crosses the white line. While detecting the white line by image processing, it is determined that the vehicle takes a right/left-turning action and not when the vehicle crosses the detected white line and not, respectively. Thus, the right/left-turning action can be determined. The method of detecting the white line can also detect the angle between the white line and the vehicle when the latter crosses the former. The angle between the white line and the vehicle when the latter crosses the former may additionally be taken into consideration for calculating the advancing direction. Whether the course is changed or not may also be determined by mutually utilizing the steering angle, winker operation, and whether or not the white line is crossed.

Figure 11:
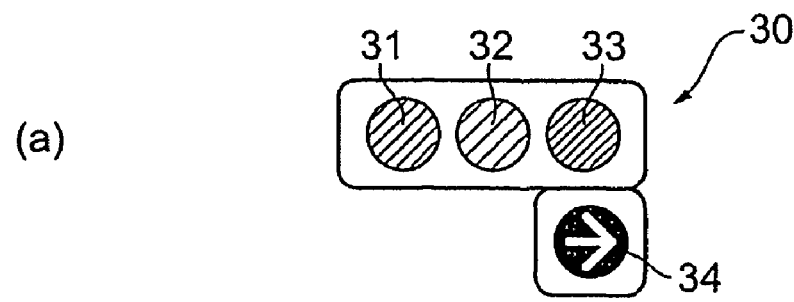
Figure 11:
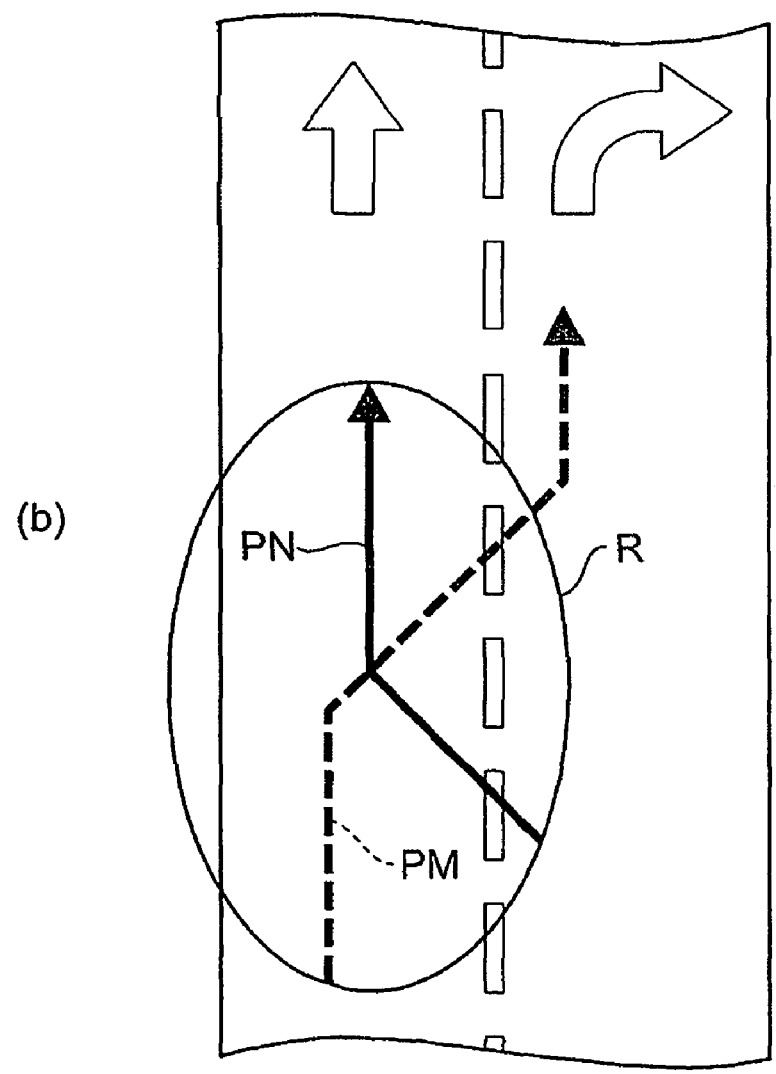

The vehicle position calculating ECU 1 in accordance with this embodiment further determines whether or not the lane is changed. Hence, as illustrated in FIG. 11(a), there is a case where a traffic light 30 has not only a green light 31, a yellow light 32, and a red light 33 but also a right-turn arrow light 34 indicating that a right turn is allowed, for example.

In this case, the presence of the traffic light 30 may additionally be taken into account when calculating the advancing direction. For example, as illustrated in FIG. 11(b), even in the case where it is determined at step S25 to be the pattern D (PD) in which the vehicle advances straightforward into the receiving area R in the left lane on the road and then deviates from the path by moving obliquely, it can be determined to be a pattern M (PM) in which the lane is changed so as to alter the advancing direction in the presence of the traffic light 30 in front.

In the case where the optical beacon 20 exists in front of the traffic light 30, whether or not the lane is changed can be determined by carrying out the above-mentioned vehicle position calculation. For instance, a running assistance or the like taking account of the right-turn arrow light 34 in the traffic light 30 may be carried out in the case where it is determined at step S28 that the vehicle changes the lane in the example illustrated in FIG. 11(b). Conversely, in the case where it is determined at step S24 that the vehicle advances straightforward after obliquely entering the receiving area R, it may be determined to be a pattern N (PN), whereby a running assistance or the like taking no account of the right-turn arrow light 34 in the traffic light 30 may be carried out.

Though a preferred embodiment of the present invention is explained in the foregoing, the present invention is not limited to the above-mentioned embodiment. For example, the receiving area may have circular, rectangular, or other polygonal fauns without being restricted to the elliptical form employed in the above-mentioned embodiment. In the case where meandering or a system malfunction occurs, the processing is terminated as it is without detecting the advancing direction in the above-mentioned embodiment, but alarm means may announce that the meandering or system malfunction occurs. Here, the alarm means may employ icon displays or sounds.

On the other hand, the advancing direction of the vehicle is calculated according to the moving distance and right/left-turning action during when receiving the optical beacon information in the above-mentioned embodiment, but a simpler structure of detecting the advancing direction from only whether or not there is a right/left-turning action during or before/after passing the receiving area may also be employed. For example, it may be determined that the lane is changed in the case where winker operation information or a steering angle signal is acquired during when receiving the optical beacon information.

Industrial Applicability

The present invention can be utilized in vehicle position calculating apparatus and vehicle position calculating methods which calculate the current position of a running vehicle.

The invention claimed is:
1. A vehicle position calculating apparatus comprising:
a vehicle position electronic control unit, the vehicle position electronic control unit including:
a reference positional information acquiring section to acquire reference positional information to become a reference position for detecting a position of a vehicle from a road-side device;
an advancing direction detecting section to detect an advancing direction of the vehicle at a point of time when the reference position is acquired;

a running state relative change detecting section to detect a relative change in a running state of the vehicle with respect to the running state of the vehicle at the point of time when the reference position is acquired;

a position calculating section to calculate the position of the vehicle according to the advancing direction of the vehicle detected by the advancing direction detecting section and the change in the running state of the vehicle detected by the running state change detecting section; and a course changing action detecting section to detect a course changing action of the vehicle, wherein when the course changing action is detected during communication with the road-side device, the advancing direction detecting section detects the advancing direction of the vehicle according to a distance traveled from when starting the communication until the course changing action is detected and a distance traveled from when the course changing action is detected until the communication ends, and the road-side device is a beacon for feeding wireless data to a receiving area having a predetermined shape on a road where the vehicle runs, the beacon supplying receiving area information concerning the receiving area by the wireless data, the vehicle position calculating apparatus further comprising:

a receiving area information acquiring section to acquire the receiving area information supplied from the beacon; and a moving distance calculating section to calculate a distance traveled by the vehicle during communication with the beacon wherein, the advancing direction detecting section detects the advancing direction of the vehicle according to the shape of the receiving area fed with the wireless data and the moving distance calculated by the moving distance calculating section.

2. A vehicle position calculating apparatus according to claim 1, wherein the position calculating section determines a relative change in the position of the vehicle with respect to the reference position according to the advancing direction of the vehicle detected by the advancing direction detecting section and the change in the running state of the vehicle detected by the running state change detecting section, and calculates the position of the vehicle according to the reference position and the relative change in the position of the vehicle with respect to the reference position.

3. A vehicle position calculating apparatus according to claim 1, wherein the advancing direction detecting section detects the advancing direction at the point of time when the vehicle acquires the reference position, while discriminating a direction along a lane provided with the road-side device and a direction traversing the lane from each other.

4. A vehicle position calculating apparatus according to claim 1, wherein the advancing direction of the vehicle defines an orientation of the vehicle at the reference position.

5. A vehicle position calculating apparatus according to claim 1, wherein the advancing direction of the vehicle is detected by comparing the distance traveled from a time when the communication with the road-side device begins until the course changing action is detected and the distance traveled from at time when the course changing action is detected until the communication with the road-side device ends.

6. A vehicle position calculating method, the method performed by a vehicle position electronic control unit, the method comprising:

acquiring reference positional information to become a reference position for detecting a position of a vehicle from a road-side device;

detecting an advancing direction of the vehicle at a point of time when the reference position is acquired;

detecting a relative change in a running state of the vehicle with respect to the running state of the vehicle at the point of time when the reference position is acquired;

calculating the position of the vehicle according to the advancing direction of the vehicle detected by the advancing direction detecting step and the change in the running state of the vehicle detected by the running state change detecting step; and detecting a course changing action of the vehicle, wherein when the course changing action is detected during communication with the road-side device, the advancing direction detecting step detects the advancing direction of the vehicle according to a distance traveled from when starting the communication until the course changing action is detected and a distance traveled from when the course changing action is detected until the communication ends, at least one of the preceding steps is performed by the vehicle position electronic control unit, and the road-side device is a beacon for feeding wireless data to a receiving area having a predetermined shape on a road where the vehicle runs, the beacon supplying receiving area information concerning the receiving area by the wireless data, the method further comprising:

acquiring the receiving area information supplied from the beacon; and calculating a distance traveled by the vehicle during communication with the beacon, wherein the advancing direction detecting step detects the advancing direction of the vehicle according to the shape of the receiving area fed with the wireless data and the moving distance calculated by the moving distance calculating step.

7. A vehicle position calculating method according to claim 6, wherein the position calculating step is a step of determining a relative change in the position of the vehicle with respect to the reference position according to the advancing direction of the vehicle detected by the advancing direction detecting step and the change in the running state of the vehicle detected by the running state change detecting step, and calculates the position of the vehicle according to the reference position and the relative change in the position of the vehicle with respect to the reference position.

8. A vehicle position calculating method according to claim 7, wherein the advancing direction detecting step detects the advancing direction at the point of time when the vehicle acquires the reference position, while discriminating a direction along a lane provided with the road-side device and a direction traversing the lane from each other.

* * * * *